UNITED STATES PATENT OFFICE.

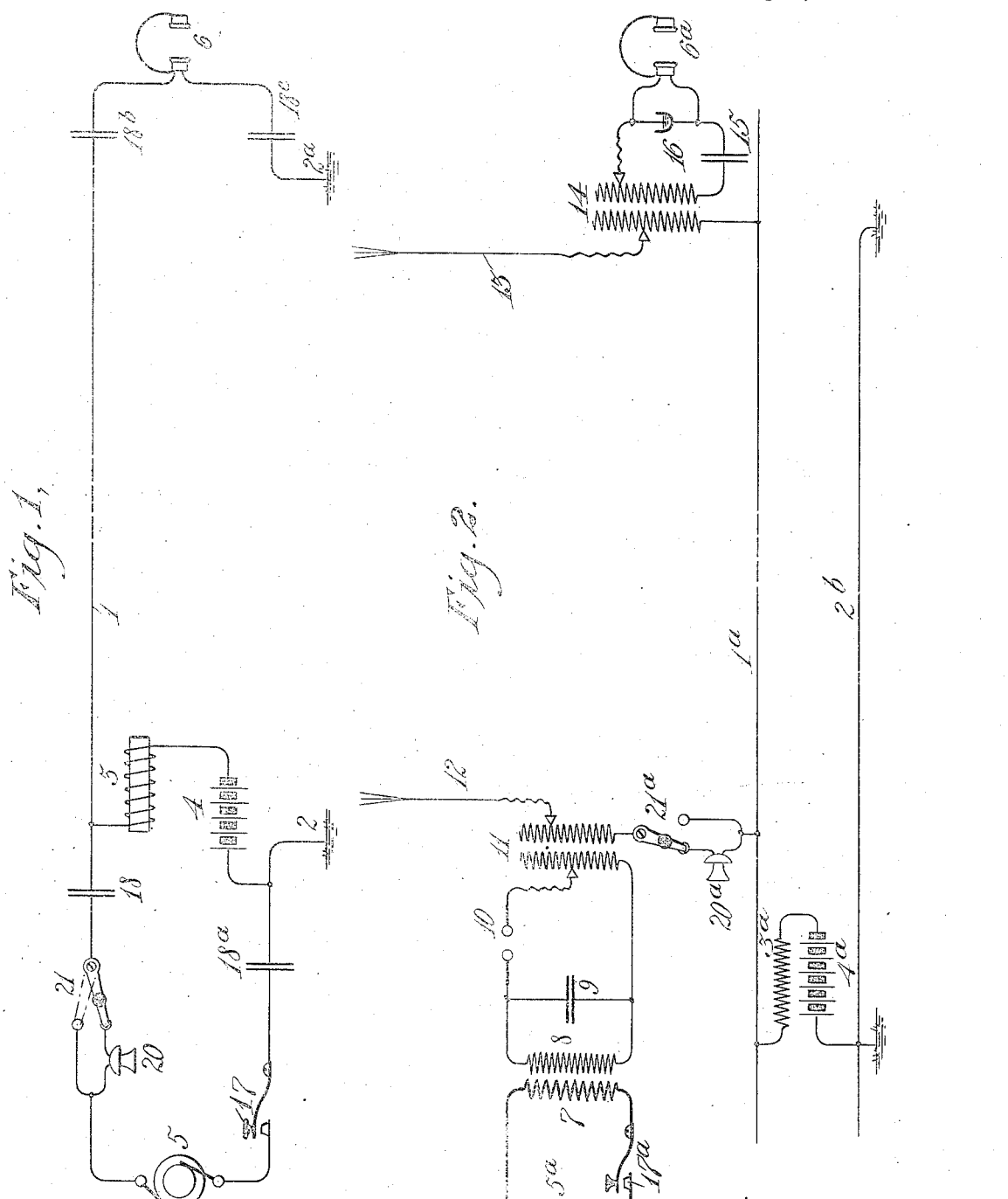

JOSEPH H. CLAUS, OF WEST PHILADELPHIA, PENNSYLVANIA.

SYSTEM FOR TELEGRAPHIC AND TELEPHONIC COMMUNICATIONS.

1,194,142. Specification of Letters Patent. Patented Aug. 8, 1916.

Application filed August 29, 1913. Serial No. 787,290.

*To all whom it may concern:*

Be it known that I, JOSEPH H. CLAUS, a citizen of the United States, and a resident of West Philadelphia, in the county of Philadelphia and State of Pennsylvania, have invented a new and Improved System for Telegraphic and Telephonic Communications, of which the following is a full, clear, and exact description.

My invention relates to systems of communication that employ a "cable" or "land wire" as part of the electric circuit for the transmission of messages, and the objects of the invention are, first, to provide means by which it is possible to carry on the communication at a considerably higher speed than heretofore with high capacity cables, this being through the use of high frequency alternating electric currents; second, to provide means for holding telephonic communication by speech over a cable or land wire by varying the volume of such high frequency alternating electric currents with a telephone transmitter in accordance with the pitch variation and amplitude of the sound waves, and third, to provide means whereby telegraphic signal communication and spoken telephonic communication can be carried on by several operators in both directions at one and the same time and all independently of each other without any communication interfering with the other or others, as high frequency oscillating electric waves of several distinct wave lengths are intended to be employed.

For a more detailed understanding of the invention, reference is to be had to the accompanying drawing and the following description and appended claims.

In the accompanying drawing which illustrates two embodiments of the invention, and wherein similar reference characters indicate corresponding parts throughout the several views, Figure 1 is a diagrammatic view showing the disposition and connections of the various instrumentalities for telegraphing and telephoning with a cable and land wire through the agency of high frequency alternating electric currents; and Fig. 2 is a diagrammatic view of the system for telegraphing and telephoning with high frequency oscillating electric waves.

Referring to Fig. 1, 1 designates the cable or land wire forming one side of the circuit, and by having its terminals grounded at 2 and $2^a$ the earth forms the other side of the circuit, but it is immaterial whether the earth or another wire is used. A charging source of current 4 is connected with the conductor 1 for creating an electro-static tension between it and the earth, and connected in parallel relation with the said charging source is a small alternating current generator 5 of any desired voltage and of suitable frequency, as, for instance, 1,000 or upward. A coil 3 of excessively high inductance is arranged in series with the line 1 and source 4 to prevent short circuiting of the high frequency electric currents from the generator 5 through the charging source 4. At the receiving end of the circuit is a double head gear telephone receiver 6 or equivalent means which is used to detect telegraphic signals and telephonic speech, such receiver being connected in series between the conductor 1 and ground $2^a$. Condensers 18, $18^a$ are arranged in the alternator containing shunt connection around the charging source 4 and coil 3, and at the opposite sides of the receiver 6 are condensers $18^b$ and $18^c$, such condensers serving to prevent short-circuiting of the charging source through the generator and receiver. For sending messages both telegraphically and telephonically a two-point switch 21 or equivalent device is used for cutting a telephone transmitter into or out of the circuit of the alternator 5, and in such alternator circuit is a key 17.

While talking the key 17 is held closed and switch 21 is thrown to transmitter 20 with generator 5 constantly subjecting the electro-static tension existing between 1 and 2 to alternating variations of electric potential through the condensers 18, which variation would be recognized as a humming sound in the telephone receiver 6. If the transmitter is then spoken into, the current flowing into the line from the generator would be subjected to an $I^2R$ loss in accordance with the pitch, duration and amplitude of sound waves, and so recognized in the telephone receiver 6. This effect travels through the wire by conduction, and also by electro-static induction through the electro-static tension between the cable or land wire 1 and the earth or a wire. For transmitting speech, the cyclage of the generator 5 would have to be very high, but this invention has to do with the combination, not with any single instrument used. For transmitting signals by means of the key 17, the switch 21 is thrown upward so as to cut out the resistance of the transmitter 20. Messages may then be sent by the usual code signals, which will be recognized as intelligent signals in the telephone receiver 6.

Duplicate transmitters and receivers may be placed at each end of the conductor 1, and at intermediate points using necessary stopping condensers. It is apparent that in this method several may listen but only one may transmit, as another sending would create what is known as interference. Tuning of telephone receiver windings to different pitch and using different cyclage generators on the several transmitters is possible but does not give entirely satisfactory results; so recourse is had to the high frequency oscillating electric waves of radio telegraphy.

My invention consists of the further combination wire telegraphic methods with those of radio telegraphy. This is done for the reason that the high frequency oscillating electric waves of radio telegraphy are adapted to sharp tuning.

It is my deduction, in radio telegraphy, that during the day period the electric waves leaving a sending aerial are transmitted almost all by conduction alone, i. e., the wave generated at the sending station travels from the sending aerial to the distant receiving aerial, over the earth's surface, arriving in the same electrical form in which it left the sending aerial. This is pure conduction, and is subject to the law of inverse squares as to loss of volume. For night transmission a different effect was deduced, and from which my invention arises. On the night side of the earth is a condition of charged atmosphere and clouds and the sending aerial modifies the electro-static tension of the clouds and atmosphere by electro-static induction due to well-known laws. In a chain of clouds highly charged, the sending waves would not only reach the distant stations of night communication by conduction alone. A wave generated in these clouds by electro-static induction would affect their electro-static tension throughout. Now in this case we have two paths of action—the conducted wave which is understood to be the weaker and the induced wave which is understood to be the stronger. If it were possible to have a continuous chain of charged clouds between stations the transmission would not be subject to a loss proportionate to the inverse square of the distance traveled; hence, greater distance would be accomplished with less power. It is my invention to produce this condition in a smaller way by charging a conductor connecting points of communication, then modifying the electro-static charge throughout the length of the conductor by means of impressing upon said conductor, high frequency oscillating electric waves of various predetermined and distinct wave lengths, thereby allowing a number of operators to telegraph by telegraphic signals and spoken telephonic speech, in both directions, back and forth, at one and the same time, all independent of each other, without interference. Fig. 2 shows the disposition and connections of the means for telegraphing and telephoning by impressing, high frequency oscillating electric waves, upon a charged conductor. The desired number of transmitting and receiving sets may be used, at any desired point on the line, by tuning each pair of transmitters and receivers to separate and distinct wave lengths. Additional branch conductors may be connected on at any desired point of the main line or conductor. The frequencies of the different alternating current generators used may also be varied to assist in preventing interference where the wave lengths used do not differ widely. Obviously the power used in this arrangement is not as great as that required for the same distance in radio telegraphy without wires. For the sake of brevity only one pair of transmitters and receivers is shown in the diagrams; each additional pair would be but a duplication.

Referring to Fig. 2, the alternating current generator $5^a$ furnishes current to the primary 7 of a suitable transformer, the secondary 8 charging the sending condenser 9, which discharges across the spark gap 10 generating high frequency electric oscillations in the primary of the tuning transformer 11 causing corresponding electric waves to be induced in the elevated capacity 12, which capacity being connected to the conductor $1^a$ impresses upon the said conductor, high frequency oscillating electric waves, which waves further are impressed upon the electro-static tension, around the conductor, and between the conductor $1^a$ and the earth or wire $2^b$. It is immaterial whether an earth connection or a wire is used as $2^b$. The electric waves can be transmitted over the conductor $1^a$ by conduction alone, but for long distances the combination of both conduction and electro-static induction methods will give the best results. The two methods of communication shown in Figs. 1 and 2 can be used in combination.

In Fig. 2 a coil $3^a$ of excessively high wave length is connected in series with the charging source $4^a$ to prevent a short circuit of the sending waves to ground, thus confining them to the conductor $1^a$ and to the electro-static charge thereon. Some leakage would take place to the earth by electro-static induction, but the main effect of the sending wave would cause a variation of potential throughout the entire charge of the conductor $1^a$ corresponding to the high frequency oscillating electric waves of the transmitter, which would be detected by the surgings up and down in the receiving capacity 13 which transfers these oscillations to the detector 16 by means of receiving tuning transformers 14. The condenser 15 is inserted in the closed receiving circuit to sustain the oscillations received and stop the detector current as in radio telegraphy. The telephone receiver 6ª is used to denote the passage of oscillations through the detector 16.

To communicate by telephone the key 17ª is closed and switch 21ª thrown to the telephone transmitter 20ª, with generator 5ª running, resulting in a continuous series of high frequency oscillating electric waves being impressed upon the electro-static tension of the conductor 1ª which will be received as a continuous humming sound in the telephone receiver 6ª. Words spoken into the telephone transmitter 20ª will be recognized as such in the telephone receiver 6ª in the well-known manner of radio telephones.

For transmitting telegraphic signals, the telephone transmitter is cut out and the telegraph key used. For telephone work the undamped waves of the oscillating arc should be used, but no claim is made for any of the instruments singly mentioned herein. I am aware that the instruments mentioned herein singly have been used heretofore, but not in the combinations I claim as my invention.

Having thus described my invention, I claim as new and desire to secure by Letters Patent:

1. The combination of two conductors extending from a sending to a receiving station and one at least being a metallic conductor, means for creating an electro-static tension between the two conductors, said means comprising a source of continuous current and an inductance in series and permanently connected with the conductors, an alternating current source for impressing energy continuously upon the metallic conductor, means for interrupting the energy for forming signals, means for varying the amplitude of the impressed energy in accordance with sound waves, and means for detecting, as messages, said interruptions or variations in the impressed energy.

2. The combination of two conductors, means for creating an electrostatic tension between them, said means comprising a source of current and an inductance in series and permanently connected respectively with the conductors, a sending capacity, a high frequency alternating current generator inductively related thereto, means energized by the generator for continuously impressing high frequency oscillating electric waves upon the conductor, means for varying the amplitude of the oscillating electric waves in accordance with variations in sound waves, and means for detecting such variations in the oscillating electric waves.

3. The combination of a metallic conductor, a charging means grounded on one side and on the other connected with the conductor for subjecting the same to an electrostatic tension, said means comprising a source of continuous current and an inductance in series with each other and connected respectively with the conductor and ground, means for impressing continuously high frequency oscillating electric waves on the conductor, means for preventing said waves from passing through the said charging means, a sending capacity connected with the means for creating the oscillating electric waves, a telephone transmitter between the said conductor and the means for producing the oscillating electric waves, a receiving capacity connected with the conductor and tuned to the means for sending the oscillating electric waves, and means inductively related to the receiving capacity for detecting the oscillating electric waves.

4. The combination of a conductor with a continuous current means permanently connected with and continuously electrically charging said conductor, a coil of excessively high inductance in series with said charging means, means for generating continuously alternating electric currents in said conductor, means for interrupting said continuously alternating electric currents to form signals, means for detecting said interruptions as signals, means for varying the amplitude of said continuously alternating electric currents in accordance with the pitch, duration and amplitude of sound waves, and means for detecting said variations, all for the purpose specified.

5. The combination of a conductor with a continuous current means permanently connected with and continuously electrically charging said conductor, a coil of excessively high wave length in series with said charging means, means for generating high frequency oscillating electric waves of various distinct wave lengths, means for impressing said high frequency oscillating electric waves upon said conductor, means for interrupting said high frequency oscillating electric waves to form signals, means for detecting said interrupted waves of various distinct wave lengths, means for varying the amplitude of continuously oscillating electric waves in accordance with the pitch, duration and amplitude of sound waves, and means for detecting said variations, all for the purpose specified.

6. The combination of a conductor extending from a sending to a receiving station, a source of continuous current having one side grounded, an inductance device connecting the other side of said source with the sending end of the conductor, the receiving end of the conductor being ungrounded, a sending antenna connected with the conductor, means for energizing the antenna to transmit messages, and a receiving apparatus including a receiving antenna connected with the conductor.

In testimony whereof I have signed my name to this specification in the presence of two subscribing witnesses.

JOSEPH H. CLAUS.

Witnesses:
A. L. KITCHIN,
PHILIP D. ROLLHAUS.